(12) United States Patent
Post et al.

(10) Patent No.: US 12,504,102 B2
(45) Date of Patent: *Dec. 23, 2025

(54) MODULAR END APPARATUS AND METHODS FOR FLEXIBLE HOSES

(71) Applicant: FORUM US, INC., Houston, TX (US)

(72) Inventors: Steven Post, Weatherford, TX (US); Peter Middleton, Aledo, TX (US)

(73) Assignee: FORUM US, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,609

(22) Filed: Nov. 13, 2023

(65) Prior Publication Data

US 2024/0077154 A1 Mar. 7, 2024

Related U.S. Application Data

(62) Division of application No. 16/914,027, filed on Jun. 26, 2020, now Pat. No. 11,815,201.

(51) Int. Cl.
*F16L 19/02* (2006.01)
*F16L 19/06* (2006.01)

(52) U.S. Cl.
CPC ............. *F16L 19/02* (2013.01); *F16L 19/06* (2013.01); *F16L 2201/20* (2013.01)

(58) Field of Classification Search
CPC ....... F16L 19/02; F16L 19/025; F16L 19/065; F16L 33/22; F16L 33/223–224; F16L 33/27; F16L 33/28
See application file for complete search history.

(56) References Cited

U.S. PATENT DOCUMENTS

| 418,906 A | 1/1890 | Bosworth |
| 964,579 A | 7/1910 | Stephens |
| (Continued) | | |

FOREIGN PATENT DOCUMENTS

| EP | 0707170 A1 * | 4/1996 | ............. F16L 33/22 |
| EP | 1540231 A1 | 6/2005 | |
| (Continued) | | | |

OTHER PUBLICATIONS

Canadian Office Action dtd May 16, 2024 for Canadian Application No. 3,183,374.

(Continued)

*Primary Examiner* — Zachary T Dragicevich
*Assistant Examiner* — Fannie Kee
(74) *Attorney, Agent, or Firm* — Patterson + Sheridan, LLP

(57) ABSTRACT

Modular end apparatus, such as modular end fitting apparatus, and methods for flexible hoses, and associated components thereof. In one implementation, a flexible hose apparatus includes a flexible hose and a hose body coupled to the flexible hose, the hose body including a threaded outer surface. The flexible hose apparatus includes a cap including an inner shoulder protruding inwardly relative to a first inner surface of the cap. The flexible hose apparatus also includes a removable end fitting disposed in engagement with the cap. The removable end fitting includes an end body that is monolithic. The end body includes a first end, a second end opposite of the first end, and a first outer shoulder adjacent the first end and disposed between the hose body and the inner shoulder of the cap.

18 Claims, 10 Drawing Sheets

(56) References Cited

U.S. PATENT DOCUMENTS

| | | | |
|---|---|---|---|
| 1,802,572 A | | 4/1931 | Phillips |
| 1,871,103 A | | 8/1932 | Jonathan |
| 1,933,769 A | | 11/1933 | Steele |
| 2,002,121 A | | 5/1935 | Mcmaster |
| 2,091,085 A | | 8/1937 | Scholtes |
| 2,147,354 A | | 2/1939 | Scholtes |
| 2,152,537 A | | 3/1939 | Couty |
| 2,188,006 A | | 1/1940 | Katcher |
| 2,219,218 A | * | 10/1940 | Berger ............... F16L 33/223 285/259 |
| 2,226,826 A | | 12/1940 | Miller |
| 2,252,920 A | | 8/1941 | Edelmann |
| 2,328,298 A | | 8/1943 | Santhoff |
| 2,394,632 A | | 2/1946 | Parker |
| 2,428,189 A | | 9/1947 | Wolfram |
| 2,551,536 A | * | 5/1951 | Harvey ............... F16L 33/223 285/148.13 |
| 2,685,458 A | | 8/1954 | Shaw |
| 2,689,141 A | * | 9/1954 | Kiekhaefer ............ F16L 19/02 285/410 |
| 2,978,262 A | | 4/1961 | Franck |
| 3,030,130 A | | 4/1962 | Appleton |
| 3,042,430 A | * | 7/1962 | Granville ............. F16L 19/02 24/270 |
| 3,120,966 A | * | 2/1964 | Lyon .................. F16L 33/224 285/222.4 |
| 4,225,160 A | * | 9/1980 | Ortloff ............... F16L 19/02 285/408 |
| 4,400,021 A | | 8/1983 | Duffield |
| 4,605,466 A | | 8/1986 | Eisenzimmer |
| 4,650,227 A | | 3/1987 | Babuder et al. |
| 4,660,869 A | * | 4/1987 | Gabus ................. F16L 19/02 285/365 |
| 4,927,192 A | | 5/1990 | Ungchusri et al. |
| 5,016,920 A | | 5/1991 | Anderson |
| 5,423,578 A | | 6/1995 | Kanomata et al. |
| 5,678,607 A | | 10/1997 | Krywitsky |
| 5,779,281 A | | 7/1998 | Kapgan et al. |
| 9,273,811 B1 | * | 3/2016 | Webber ................ F16L 33/22 |
| 10,781,948 B1 | * | 9/2020 | Gregory ............... F16L 19/02 |
| 2003/0122377 A1 | * | 7/2003 | Northrop .............. F16L 19/02 285/363 |
| 2005/0225085 A1 | | 10/2005 | Markward et al. |
| 2006/0112534 A1 | * | 6/2006 | Seton-Anderson ..... F16L 19/02 29/508 |
| 2009/0224536 A1 | | 9/2009 | Fukushima et al. |
| 2010/0201124 A1 | | 8/2010 | Duquette et al. |
| 2011/0214445 A1 | | 9/2011 | Han et al. |
| 2011/0220343 A1 | | 9/2011 | Drake et al. |
| 2012/0227221 A1 | * | 9/2012 | Whitaker ............. F16L 19/025 29/525.08 |
| 2012/0326440 A1 | * | 12/2012 | Weinhold ............. F16L 19/02 285/374 |
| 2013/0087381 A1 | | 4/2013 | Daughtry et al. |
| 2013/0181445 A1 | | 7/2013 | Glime et al. |
| 2016/0281893 A1 | | 9/2016 | Inaba |
| 2017/0159866 A1 | | 6/2017 | Glejbol |
| 2021/0172549 A1 | | 6/2021 | Ivett |

FOREIGN PATENT DOCUMENTS

| | | | | |
|---|---|---|---|---|
| EP | 3018395 A1 | | 5/2016 | |
| GB | 1251202 A | | 10/1971 | |
| WO | 2013054977 A1 | | 4/2013 | |
| WO | WO-2015193164 A1 | * | 12/2015 | ............ F16L 19/025 |
| WO | 2020053488 A1 | | 3/2020 | |

OTHER PUBLICATIONS

Bertoni, Fabiano, "End Fitting for Unbonded Flexible Pipes", Simeros Technologies, Apr. 2017, <http://simeros.com/end-fitting-for-unbonded-flexible-pipes/?lang=en>, last accessed Jul. 15, 2020.

"FlexConnect HP Frac Hose", National Oilwell Varco, <https://www.nov.com/-/media/nov/files/products/caps/intervention-and-stimulation-equipment/flexconnect-hp-frac-hose/flexconnect-hp-frac-hose-flyer.pdf>, last accessed Jul. 15, 2020.

"Coflexip Flexible Pipe", Halliburton, <https://www.halliburton.com/content/dam/ps/public/ts/contents/Data_Sheets/web/H/H012193-CoflexipPipe.pdf>, last accessed Jul. 15, 2020.

"Coflexip®—Flexible Steel Pipe for Drilling and Service Applications", "The Coflexip® Flexible Line", Technip, <http://www.pancalima.co.id/images/Drilling-Broc.pdf>, last accessed Jul. 21, 2020.

"Completions", TechnipFMC, <https://www.technipfmc.com/en/what-we-do/surface/upstream/completions>, last accessed Aug. 6, 2020.

"Black Eagle Product Manual Catalogue 4466-UK", Parker, <https://www.parker.com/literature/Energy%20Products%20Division/Polyflex%20Catalogs/BE%20Catalogue%204466-UK.pdf>, last accessed Aug. 6, 2020.

"Copper State Rubber Online Catalog", Copper State Rubber, <https://copperstaterubber.com/catalog>, last accessed Aug. 6, 2020.

"Coflexip Hoses 3-1/16?x 19.6ft Choke & Kill Line", Triconser, <https://triconser.com/coflexip-hoses-3-1-16-x-19-6ft-choke-kill-line/>, last accessed Aug. 6, 2020.

"High Pressure Flexible User Guide", ContiTech, <https://aosoffshore.com/wp-content/uploads/2020/02/ContiTech_High-Pressure-Flexible-User-Guide.pdf>, last accessed Aug. 6, 2020.

"FlexConnect HP Frac Hose", National Oilwell Varco, <https://www.nov.com/products/flexconnect-hp-frac-hose>, last accessed Aug. 6, 2020.

PCT International Search Report and Written Opinion dated Sep. 7, 2021, for International Application No. PCT/US2021/034571.

Canadian Office Action dated Sep. 12, 2025, for Canadian Patent Application No. 3,183,374.

* cited by examiner

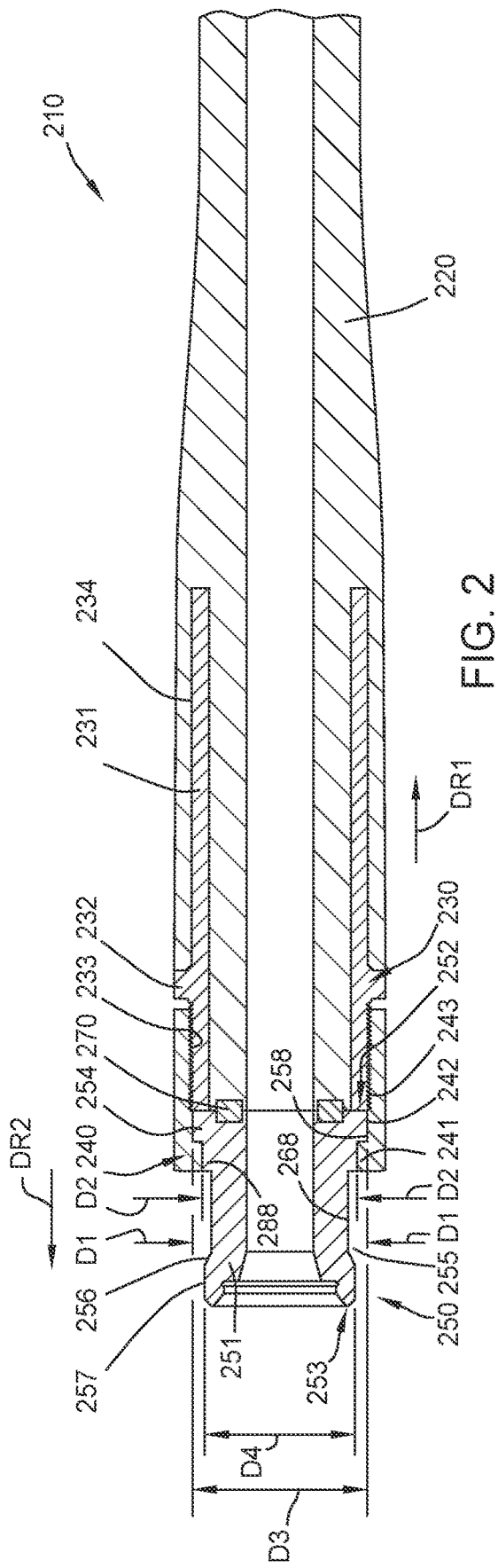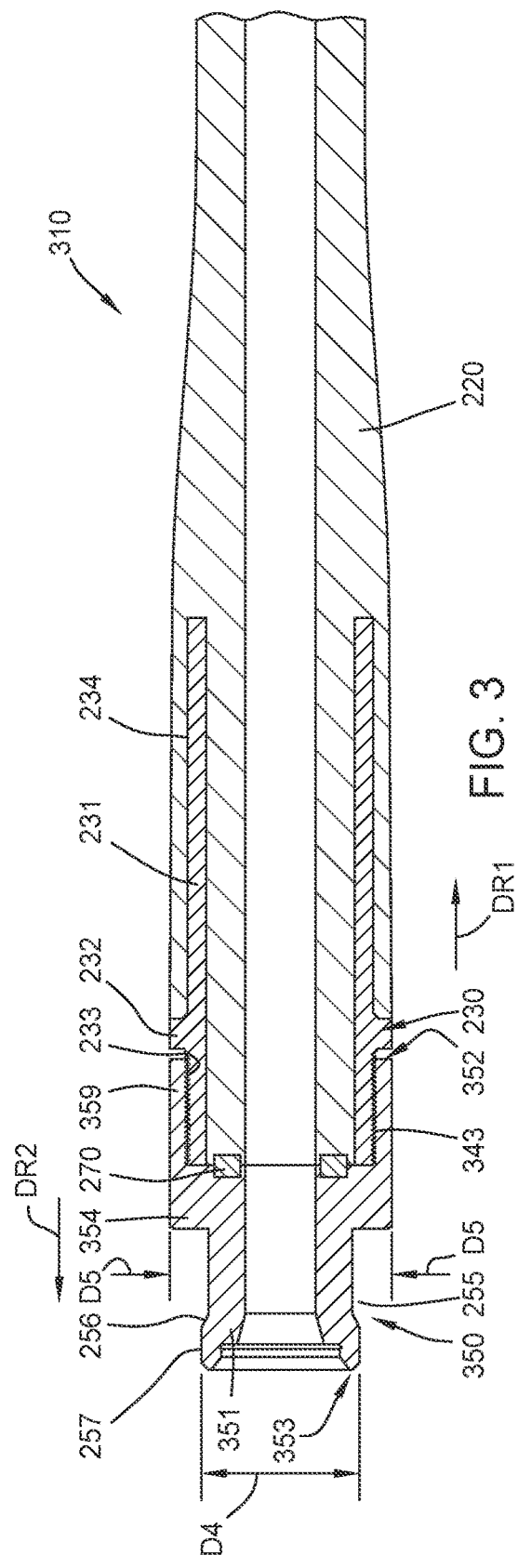

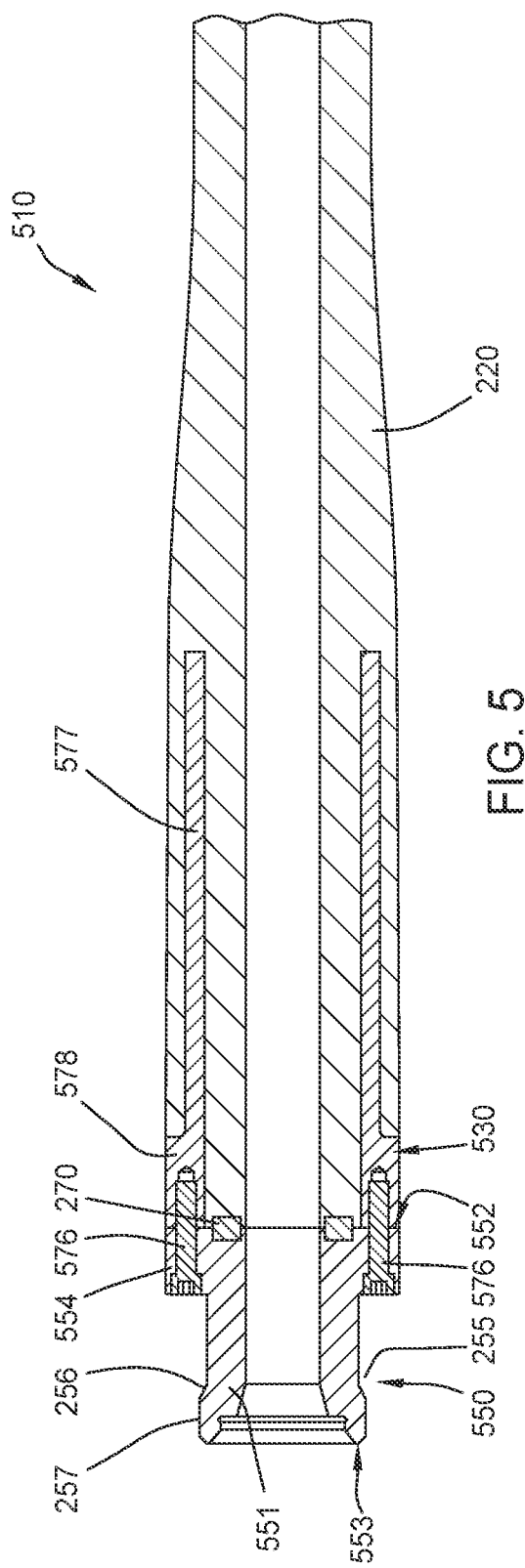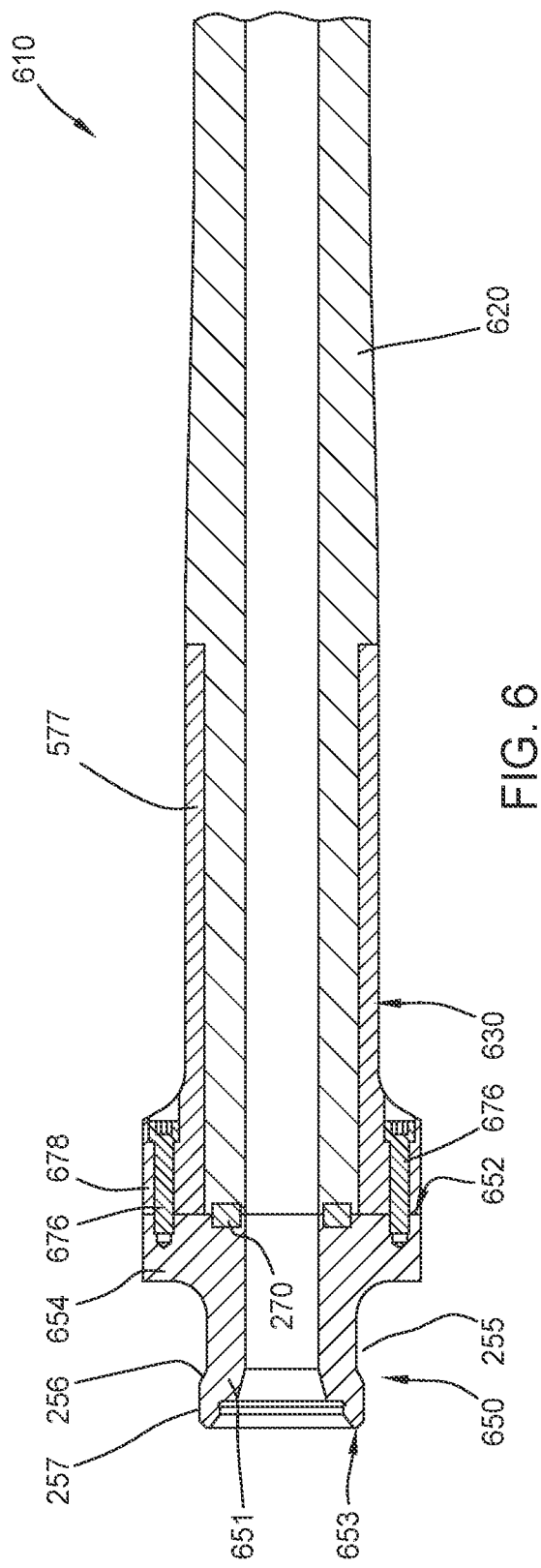

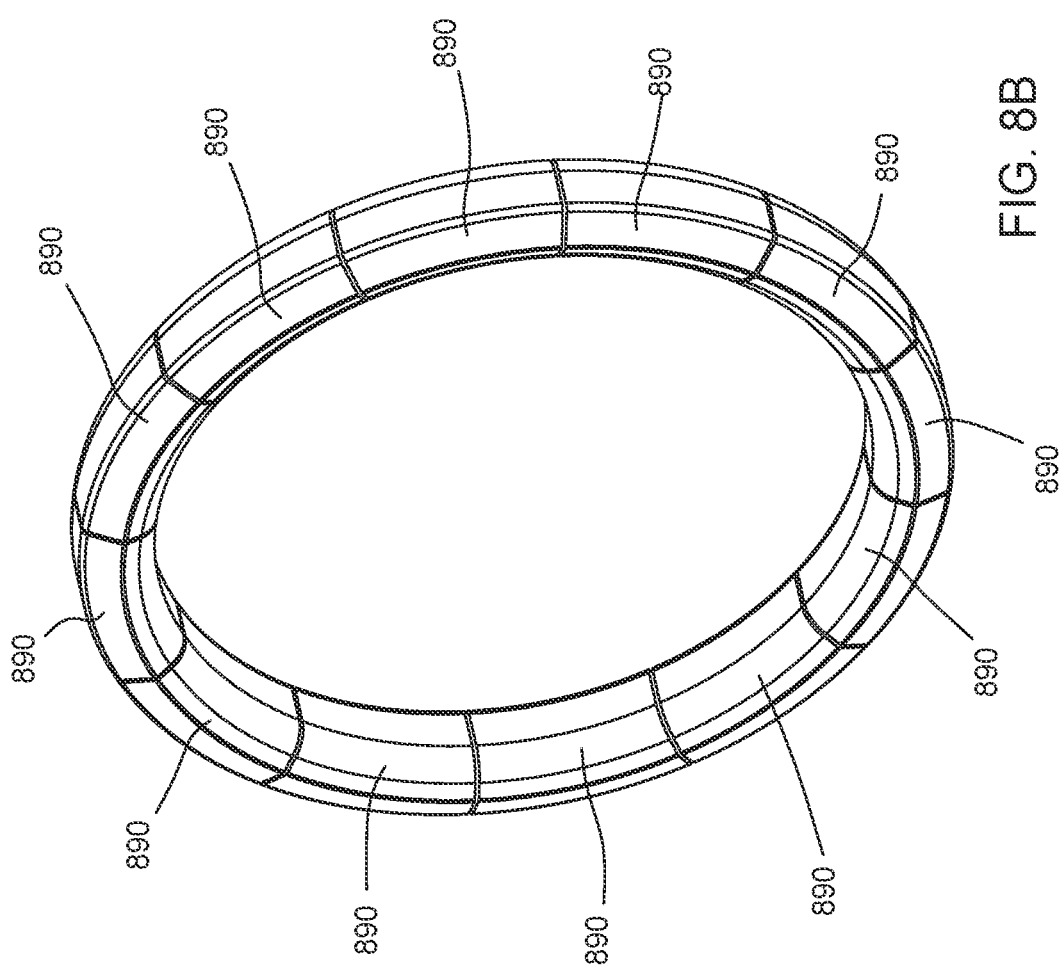

MODULAR END APPARATUS AND METHODS FOR FLEXIBLE HOSES

CROSS-REFERENCE TO RELATED APPLICATIONS

This application is a divisional of co-pending U.S. patent application Ser. No. 16/914,027, filed Jun. 26, 2020, which is herein incorporated by reference in its entirety.

BACKGROUND

Field

The disclosure relates to modular end apparatus, such as modular end fitting apparatus, and methods for flexible hoses, and associated components thereof. The flexible hoses may be deployed at a wellhead site, such as in conjunction with fluid injection systems that inject fluids, such as frac fluids or production fluids, into wellheads at the wellhead site.

Description of the Related Art

Flexible hoses can fail due to operational conditions, such as operating pressure, corrosion, vibrations and pulsations of the equipment used with flexible hoses. Failures due to such operational conditions can be more likely for land-based operations because, for example, operating pressures, flow rates, and abrasives content can be high for land-based operations. End components/connections of flexible hoses can fail before the flexible hoses, and the end components may not be replaceable such that the entire flexible hose is replaced, leading to shorter operating lives for flexible hoses, operational inefficiencies, and increased costs.

Therefore, there is a need for a modular end for flexible hoses that may be replaced without replacing the flexible hose.

SUMMARY

Implementations of the present disclosure relate to modular end apparatus, such as modular end fitting apparatus, and methods for flexible hoses, and associated components thereof.

In one implementation, a flexible hose apparatus includes a flexible hose and a hose body coupled to the flexible hose, the hose body including a threaded outer surface. The flexible hose apparatus includes a cap including an inner shoulder protruding inwardly relative to a first inner surface of the cap. The first inner surface has a first inner diameter and the inner shoulder has a second inner diameter that is lesser than the first inner diameter. The cap includes a threaded inner surface disposed in threaded engagement with the threaded outer surface of the hose body. The flexible hose apparatus also includes a removable end fitting disposed in engagement with the cap. The removable end fitting includes an end body that is monolithic. The end body includes a first end, a second end opposite of the first end, and a first outer shoulder adjacent the first end and disposed between the hose body and the inner shoulder of the cap.

In one implementation, a flexible hose apparatus includes a flexible hose and a hose body coupled to the flexible hose, the hose body including a threaded outer surface. The flexible hose apparatus also includes a removable end fitting disposed in engagement with the hose body. The removable end fitting includes an end body that is monolithic. The end body includes a first outer shoulder and a second outer shoulder adjacent an end of the end body. The flexible hose apparatus also includes a ring portion protruding from the first outer shoulder of the end body and disposed about the hose body. The ring portion includes a threaded inner surface disposed in threaded engagement with the threaded outer surface of the hose body.

In one implementation, a flexible hose apparatus includes a flexible hose and a hose body coupled to the flexible hose. The flexible hose apparatus also includes a removable end fitting. The removable end fitting includes an end body that is monolithic. The end body includes a first end, a second end opposite of the first end, and a first outer shoulder adjacent the first end and abutting against the hose body. The flexible hose apparatus also includes a plurality of fasteners coupling the end body of the removable end fitting to the hose body.

In one implementation, a flexible hose apparatus includes a flexible hose and a hose body coupled to the flexible hose. The hose body includes an outer shoulder. The flexible hose apparatus also includes a removable end fitting. The removable end fitting includes an end body that is monolithic. The end body includes a first end, a second end opposite of the first end, and a first outer shoulder adjacent the first end and abutting against the hose body. The end body also includes a second outer shoulder adjacent the second end. The flexible hose apparatus also includes a plurality of clamps coupling the end body of the removable end fitting to the hose body.

In one implementation, a flexible hose apparatus includes a flexible hose and a hose body coupled to the flexible hose, the hose body including a threaded outer surface. The flexible hose apparatus includes a cap including an inner shoulder protruding inwardly relative to a first inner surface of the cap. The first inner surface has a first inner diameter and the inner shoulder has a second inner diameter that is lesser than the first inner diameter. The cap includes a threaded inner surface disposed in threaded engagement with the threaded outer surface of the hose body. The flexible hose apparatus also includes a removable end fitting disposed in engagement with the cap. The removable end fitting includes an end body that is monolithic. The end body includes a first end, a second end opposite of the first end, an outer shoulder adjacent the second end, and an outer groove formed between the first end and the second end. The flexible hose apparatus also includes a plurality of ring segments disposed between the end body and the cap. The plurality of ring segments are disposed at least partially in the outer groove of the end body and abutting against the inner shoulder of the cap.

In one implementation, a flexible hose apparatus includes a flexible hose and a hose body coupled to the flexible hose. The flexible hose apparatus also includes a removable end fitting. The removable end fitting includes an end body that is monolithic. The end body includes a first end, a second end opposite of the first end, and a first outer shoulder adjacent the first end. The end body also includes a second outer shoulder adjacent the second end. The flexible hose apparatus also includes a plurality of fasteners coupling the end body of the removable end fitting to the hose body.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a schematic partial illustration of a cross-sectional view of a flexible hose apparatus, according to one implementation.

FIG. 3 is a schematic partial illustration of a cross-sectional view of a flexible hose apparatus, according to one implementation.

FIG. 5 is a schematic partial illustration of a cross-sectional view of a flexible hose apparatus, according to one implementation.

FIG. 6 is a schematic partial illustration of a cross-sectional view of a flexible hose apparatus, according to one implementation.

FIG. 8B is a schematic partial illustration of a perspective view of the plurality of ring segments shown in FIG. 8A, according to one implementation.

Figure 1:
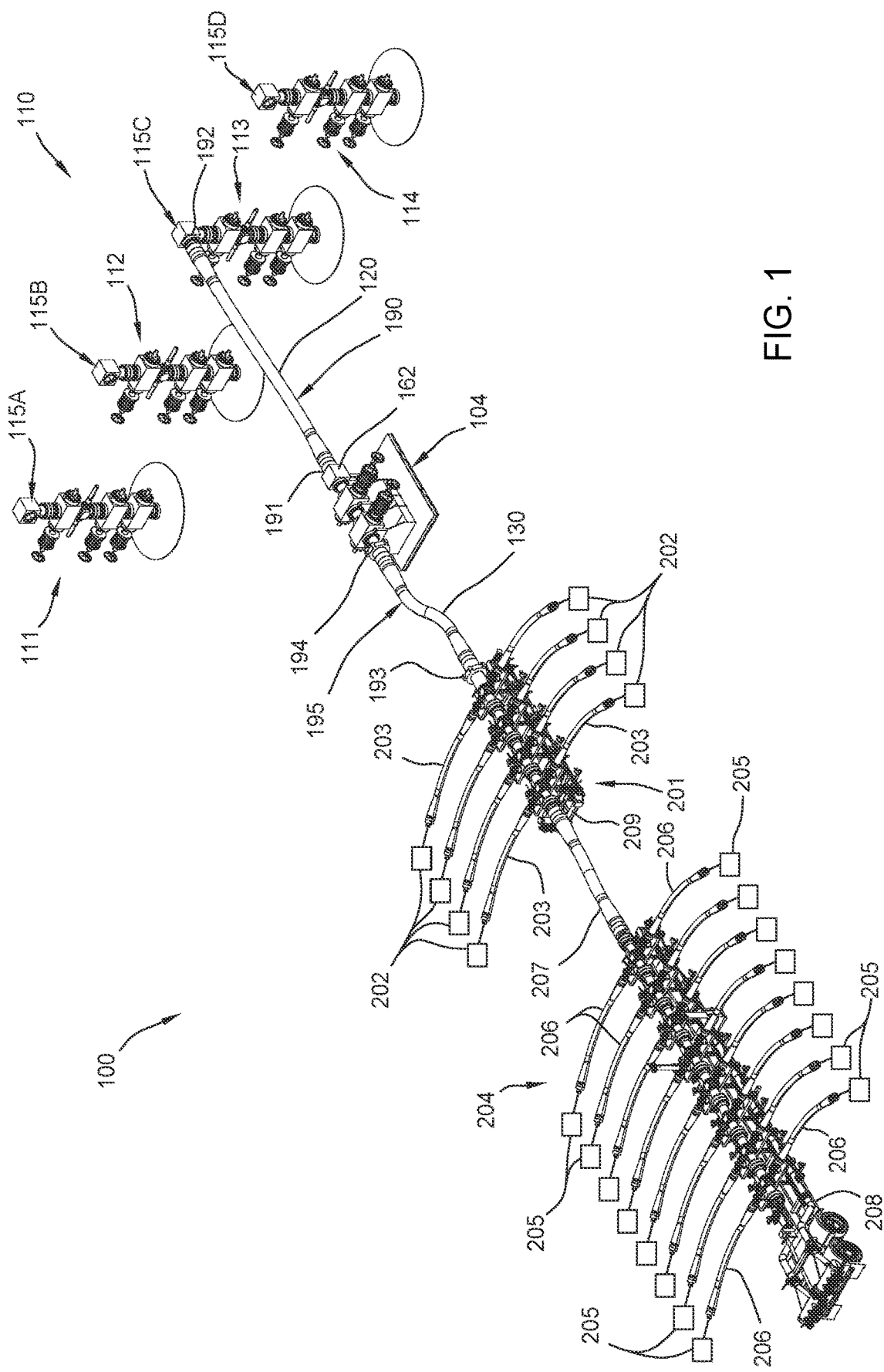
FIG. 1 is a schematic partial illustration of a fluid injection system deployed at a wellhead site, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to modular end apparatus, such as modular end fitting apparatus, and methods for flexible hoses, and associated components thereof. The flexible hoses may be deployed at a wellhead site, such as in conjunction with fluid injection systems that inject fluids, such as frac fluids or production fluids, into wellheads at the wellhead site.

FIG. 1 is a schematic partial illustration of a fluid injection system 100 deployed at a wellhead site 110, according to one implementation. The fluid injection system 100 includes an instrumentation skid 104. The wellhead site 110 includes a plurality of wellheads 111-114 (four are shown). The plurality of wellheads 111-114 includes a first wellhead 111, a second wellhead 112, a third wellhead 113, and a fourth wellhead 114. Each wellhead of the plurality of wellheads 111-114 may include, for example, a Christmas tree. The plurality of wellheads 111-114 includes a first connection head 115A, a second connection head 115b, a third connection head 115C, and a fourth connection head 115D. Each of the connection heads 115A-115D may include tubing or piping, flanges, blocks and/or locking ring assemblies that connect flexible hoses to the connection heads 115A-115D.

A flexible hose apparatus 190 is coupled to the third wellhead 113 and the instrumentation skid 104. The flexible hose apparatus 190 includes two removable end fittings 191, 192 coupled to both ends of a flexible hose 120. A first end fitting 191 is coupled to a block 162 of the instrumentation skid 104 using a flange of the first end fitting 191. A second end fitting 192 is coupled to the third connection head 115C of the third wellhead 113 using a flange of the second end fitting 192. The instrumentation skid 104 may include equipment such as valves.

The fluid injection system 100 includes a first manifold 201 and a second manifold 204. Each of the first manifold 201 and/or the second manifold 204 includes, for example, a pump manifold, a wellhead connection jumper system, an instrumentation skid, a pod system, and/or a zipper frac manifold. In one embodiment, which can be combined with other embodiments, the first manifold 201 is a pump manifold and includes a plurality of first pumps 202 coupled to the first manifold 201 through a plurality of flexible hose apparatus 203 to pump a fluid into the first manifold 201. In one example, a removable end fitting of each flexible hose apparatus 203 is coupled to a fluid end of a respective first pump 202. The present disclosure contemplates that terms used herein such as "coupled," "couples," and "coupling" can include direct coupling and/or indirect coupling. As an example, a removable end fitting of each flexible hose apparatus 203 can be directly coupled to a fluid end of the respective first pump 202, or the removable end fitting can be coupled to the fluid end of the respective first pump 202 through an iron string.

A flexible hose apparatus 195 is coupled between the instrumentation skid 104 and the first manifold 201. The flexible hose apparatus 195 includes two removable end fittings coupled to both ends of a flexible hose 130. A first end fitting includes a hammer union 193 coupled to the first end fitting of the flexible hose apparatus 195. The hammer union 193 couples the first end fitting to the first manifold 201. A second hammer union 194 coupled to a second end fitting of the flexible hose apparatus 195 couples the second end fitting to the instrumentation skid 104. Although hammer unions 193, 194 are illustrated in FIG. 1, the first and/or second end fittings may alternatively be flanged end connections.

In one embodiment, which can be combined with other embodiments, the second manifold 204 is a pump manifold and includes a plurality of second pumps 205 coupled to the second manifold 204 through a plurality of flexible hose apparatus 206 to pump a fluid into the second manifold 204. A flexible hose apparatus 207 is coupled between the first manifold 201 and the second manifold 204 to supply the fluid pumped by the second pumps 205 from the second manifold 204 and into the first manifold 201. The second manifold 204 is supported on a trailer 208 and the first manifold 201 is supported on a pump skid 209. The present disclosure contemplates that the first manifold 201 and the second manifold 204 may include a multi-skid pod system.

The fluid injection system 100 is deployed during a method of using the fluid injection system 100 to inject a fluid into the third wellhead 113 to frac or stimulate the third wellhead 113. The fluid may include, for example, a well stimulation fluid or a hydraulic fracturing fluid. The fluid pumped into the second manifold 204 by the second pumps 205 and the fluid pumped into the first manifold 201 by the first pumps 202 is pumped into the third wellhead 213.

According to the present disclosure, removable end fittings are coupled to a piece of equipment. The piece of equipment includes one or more of a zipper frac device (such as a zipper frac manifold), a pump manifold, a wellhead connection jumper system, a pod system, a fluid end of a pump, an instrumentation skid, or a wellhead. The wellhead connection jumper system includes a single flexible hose that connects to and disconnects from a plurality of wellheads. The removable end fittings couple to the pieces of equipment using a flange of the respective removable end fitting or a connection device. The connection device includes a hub (such as a hub of a clamped connection, for example a Grayloc® connection, or an API 16A connection) coupled to the respective removable end fitting, one or more clamps coupled to the respective removable end fitting, a connection sub (such as a hydraulic latch sub or a mechanical quick disconnect sub) coupled to the respective removable end fitting, or a hammer union coupled to the respective removable end fitting. The removable end fittings couple to tubing or piping, flanges, blocks and/or locking ring assemblies of the pieces of equipment.

In one embodiment, which can be combined with other embodiments, a first removable end fitting coupled to a first end of a flexible hose is coupled to a zipper frac device and a second removable end fitting coupled to a second end of the flexible hose is coupled to a wellhead or a pump manifold.

In one embodiment, which can be combined with other embodiments, a first removable end fitting coupled to a first end of a flexible hose is coupled to a fluid end of a pump (such as a frac pump) and a second removable end fitting coupled to a second end of the flexible hose is coupled to a pump manifold. In one example, the first removable end fitting is coupled the fluid end of the pump through an iron string that is coupled to the fluid end.

In one embodiment, which can be combined with other embodiments, a first removable end fitting coupled to a first end of a flexible hose is coupled to a zipper frac manifold and a second removable end fitting coupled to a second end of the flexible hose is coupled to a wellhead.

In one embodiment, which can be combined with other embodiments, a first removable end fitting coupled to a first end of a flexible hose is coupled to an instrumentation skid and a second removable end fitting coupled to a second end of the flexible hose is coupled to a zipper frac device or a pump manifold.

FIG. 2 is a schematic partial illustration of a cross-sectional view of a flexible hose apparatus 210, according to one implementation. The flexible hose apparatus 210 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof.

The flexible hose apparatus 210 includes a flexible hose 220, a hose body 230 coupled to the flexible hose 220, a cap 240, and a removable end fitting 250. The hose body 230 is coupled to one of the two ends of the flexible hose 220. Each of the flexible hose 220 and the removable end fitting 250 includes a central opening for flow of fluids, such as production fluids or frac fluids. The hose body 230 includes an elongated ring body 231, an outer shoulder 232 protruding outwardly from the elongated ring body 231, and a threaded outer surface 233 disposed outwardly of the outer shoulder 232. The flexible hose 220 is formed within a central opening of the hose body 230 and outside of and along an outer surface 234 of the hose body 230 that is disposed inwardly of the outer shoulder 232. The flexible hose 220 may be formed within the central opening of the hose body 230 and not along the outer surface 234 of the hose body 230 (similar to the flexible hose 620 shown in FIG. 6). In one embodiment, which can be combined with other embodiments, the elongated ring body 231 of the hose body 230 is bonded to the flexible hose 220 using a bonding material, such as an epoxy, an adhesive, and/or a glue. In one example, the material of the flexible hose 220 includes an elastomeric material, such as a rubber.

The cap 240 includes an inner shoulder 241 that protrudes inwardly relative to a first inner surface 242. The cap 240 also includes a threaded inner surface 243. The first inner surface 242 is disposed between the inner shoulder 241 and the threaded inner surface 243. The threaded inner surface 243 is disposed in threaded engagement with the threaded outer surface 233 of the hose body 230. The first inner surface 242 includes a first inner diameter D1, and the inner shoulder 241 includes a second inner diameter D2 that is lesser than the first inner diameter D1. In one embodiment, which can be combined with other embodiments, the threaded inner surface 243 of the cap 240 and the threaded outer surface 233 of the hose body 230 each includes a Stub ACME thread arrangement to facilitate a beneficial fatigue life and thread durability for coupling of the cap 240 with the hose body 230. The present disclosure contemplates that other thread arrangements, such as a Unified thread arrangement, may be used for the threaded inner surface 243 and the threaded outer surface 233.

In one embodiment, which can be combined with other embodiments, the threaded inner surface 243 of the cap 240 and the threaded outer surface 233 of the hose body 230 each includes a left-hand thread arrangement that facilitates tightening the connection between the cap 240 and the hose body 230 upon tightening a connection between the removable end fitting 250 and a piece of equipment. As an example, the left-hand thread arrangement used between the cap 240 and the hose body 230 facilitates tightening the left-hand thread arrangement upon hammering of a hammer union used to couple the removable end fitting 250 to a piece of equipment. The present disclosure contemplates that other thread arrangements, such as a right-hand thread arrangement, can be used for the threaded inner surface 243 and the threaded outer surface 233.

The removable end fitting 250 is removable from the end of the flexible hose 220 such that a different removable end fitting may be installed on the end of the flexible hose in place of the removable end fitting 250, such as when the removable end fitting 250 is to be repaired, maintained, or discarded. The removable end fitting 250 includes a single end body 251 that is unitary and monolithic. The end body 251 of the removable end fitting 250 is disposed in engagement with the cap 240 and the hose body 230. The end body 251 includes a first end 252, a second end 253 opposite of the first end 252, and a first outer shoulder 254 that is adjacent the first end 252. The first outer shoulder 254 is disposed and retained between an end of the hose body 230 and the inner shoulder 241 of the cap 240. The first outer shoulder 254 includes a first outer diameter D3 that is equal to or lesser than the first inner diameter D1 of the cap 240. The first outer diameter D3 is greater than the second inner diameter D2 of the cap 240.

The end body 251 also includes an outer groove 255 formed in an outer circumferential surface of the end body 251. The outer groove 255 is formed between the first outer shoulder 254 and the second end 253. The end body 251 also includes a second outer shoulder 256 formed adjacent the second end 253. In one embodiment, which can be combined with other embodiments, the second outer shoulder 256 includes a threaded outer surface, such as a threaded outer surface having external threads on a female end of the end body 251 to engage with a male end of a hammer union. In one embodiment, which can be combined with other embodiments, the end body 251 includes an inner surface having internal threads on a male end of the end body 251 to engage a female end of the hammer union. In one embodiment, which can be combined with other embodiments, the end body 251 includes a wing nut disposed within the end body 251, and the wing nut includes internal threads coupled to a male end of a connection sub using ring segments. In one embodiment, which can be combined with other embodiments, the second outer shoulder 256 includes a hub of a connection, such as a hub of a Grayloc® connection. The second outer shoulder 256 is formed between the outer groove 255 and an outer surface 257 that is adjacent the second end 253. In one example, the outer surface 257 is a threaded outer surface of the second outer shoulder 256 and the outer groove 255 is a thread relief. The present disclosure contemplates that the outer groove 255 may be omitted, and a threaded outer surface (such as an outer surface 268 including threads) may be included on the end body 251. The outer groove 255 is formed between the second outer shoulder 256 and the first outer shoulder 254. The second outer shoulder 256 includes a second outer diameter D4 that is lesser than the first outer diameter D3. The second outer diameter D4 is lesser than the first inner diameter D1 of the first inner surface 242 and is equal to or lesser than the second inner diameter D2 of the inner shoulder 241. The second outer shoulder 256 is at least partially formed by the outer groove 255. The end body 251 also includes a recessed outer shoulder 288 that is recessed inwardly relative to the first outer shoulder 254. An outer surface of the recessed outer shoulder 288 interfaces with and is disposed within an inner surface of the inner shoulder 241.

A first outer surface 258 of the first outer shoulder 254 of the end body 251 interfaces with and is disposed within the first inner surface 242 of the cap 240. The flexible hose apparatus 210 includes a primary seal 270 disposed between the end body 251 of the removable end fitting 250 and the flexible hose 220. In one example, the primary seal 270 is disposed in respective recesses of the end body 251 and the flexible hose 220. The present disclosure contemplates that a seal, for example a face seal (such as the primary seal 270) and/or a radial seal, may be disposed between an inner diameter of the hose body 230 and an outer diameter of the end body 251. The present disclosure also contemplates that a portion (such as rubber material) of the flexible hose 220 may be used as a face seal and/or a radial seal. As an example, a portion of the flexible hose 220 may be compressed and/or expanded into a seal position, such as a seal position between the end body 251 and the flexible hose 220 and/or the hose body 230. The present disclosure contemplates that a seal may be used along the inner diameter (e.g., the flow bore) of the flexible hose 220. In one example, a portion of the flexible hose 220 is compressed and/or expanded into a sealing position between the inner diameter (e.g., the flow bore) of the end body 251 and the hose body 230 and/or the flexible hose 220. The removable end fitting 250 includes a single end body 251 that can couple to the flexible hose 220 and the hose body 230 using the cap 240 without the use of an insert that is a separate body from the end body 251.

Embodiments of the disclosure include methods of installing removable end fittings on, and removing removable end fittings from, flexible hoses and/or hose bodies. As an example, methods of forming flexible hose apparatus are disclosed. As an example, a method of forming the flexible hose apparatus 210 shown in FIG. 2 is disclosed. The hose body 230 and the flexible hose 220 are bonded together. The second end 253 of the end body 251 of the removable end fitting 250 is disposed within the cap 240, and the end body 251 is moved relative to the cap 240 in a direction DR2. The direction DR2 is from the threaded inner surface 243 and toward the inner shoulder 241 of the cap 240. The outer surface 257, the second outer shoulder 256, and the recessed outer shoulder 288 are sized and shaped to move within and/or past the inner shoulder 241 in the direction DR2. The end body 251 is moved in the direction DR2 until the first outer shoulder 254 is abutted and stopped against the inner shoulder 241 of the cap 240. The threaded inner surface 243 of the cap 240 is threaded with the threaded outer surface 233 of the hose body 230 in the direction DR1 to move the cap 240 relative to the hose body 230. The cap 240 is threaded onto the hose body 230 until the first outer shoulder 254 contacts an end of the hose body 230 and contacts the inner shoulder 241. The cap 240 is threaded onto the hose body 230 until the primary seal 270 is compressed and/or expanded into a sealing position. The first outer shoulder 254 is retained between the inner shoulder 241 and the end of the hose body 230 to couple the end body 251 to the hose body 230 and/or the flexible hose 220.

Aspects of the various flexible hose apparatus described herein facilitate benefits on flexible hose devices having flow bores with a diameter of lesser than 5.0 inches, such as 3.5 inches or less. As an example, each of the end body 251 and the flexible hose 220 shown in FIG. 2 may include a flow bore having a diameter of lesser than 5.0 inches, such as 3.5 inches or less. Aspects of the flexible hose apparatus 210 facilitate using such flow bore diameters and facilitate benefits such as ease of removal and replacement of the removable end fitting 250 on the flexible hose 220; ease of installation of the removable end fitting 250 on the flexible hose 220; increased operational lifespans of the flexible hose apparatus 210; withstanding of operational conditions such as high operating pressures and vibrations in land-based applications (for example land-based stimulation operations); reduced likelihoods of failures of the flexible hose apparatus 210; increased operational efficiencies, and reduced operational costs; and modularity in application of the removable end fitting 250.

The present disclosure contemplates that aspects of the various flexible hose apparatus described herein may be used on flexible hose devices having flow bores of other diameters, such as flexible hose devices having flow bores with a diameter of 5.0 inches or greater.

FIG. 3 is a schematic partial illustration of a cross-sectional view of a flexible hose apparatus 310, according to one implementation. The flexible hose apparatus 310 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 310 is similar to the flexible hose apparatus 210 shown in FIG. 2, and may include one or more of the aspects, features, components, and/or properties thereof.

The flexible hose apparatus 310 includes a removable end fitting 350 that is similar to the removable end fitting 250 shown in FIG. 2, and may include one or more of the aspects, features, components, and/or properties thereof. The removable end fitting 350 includes an end body 351 that is similar to the end body 251 shown in FIG. 2. The end body 351 includes a first end 352 and a second end 353 opposite of the first end 352. The end body 351 is disposed in threaded engagement with the hose body 230. The end body 351 includes a first outer shoulder 354 adjacent the first end 352. The outer groove 255 is formed between the first outer shoulder 354 and the second outer shoulder 256. The end body 351 includes a ring portion 359 that protrudes inwardly from the first outer shoulder 354 in a direction DR1 from the end body 351 and toward the flexible hose 220 and the hose body 230. The ring portion 359 is disposed about the elongated ring body 231 of the hose body 230 outwardly of the outer shoulder 232. The present disclosure contemplates that a ring welded to the elongated ring body 231 may be used in place of the outer shoulder 232. The present disclosure also contemplates that the outer shoulder 232 may be omitted from the hose body 230. The ring portion 359 includes a threaded inner surface 343 that is disposed in threaded engagement with the threaded outer surface 233 of the hose body 230.

The first outer shoulder 354 includes a first outer diameter D5 that is larger than the second outer diameter D4 of the second outer shoulder 256. The present disclosure contemplates that the second outer diameter D4 may be larger than the first outer diameter D5, such as if the second end 353 of the end body 351 includes a flange. The removable end fitting 350 includes a single end body 351 that can couple to the flexible hose 220 and/or the hose body 230 without the use of an insert that is a separate body from the end body 351, and without the use of a cap that is a separate body from the end body 351.

Figure 4:
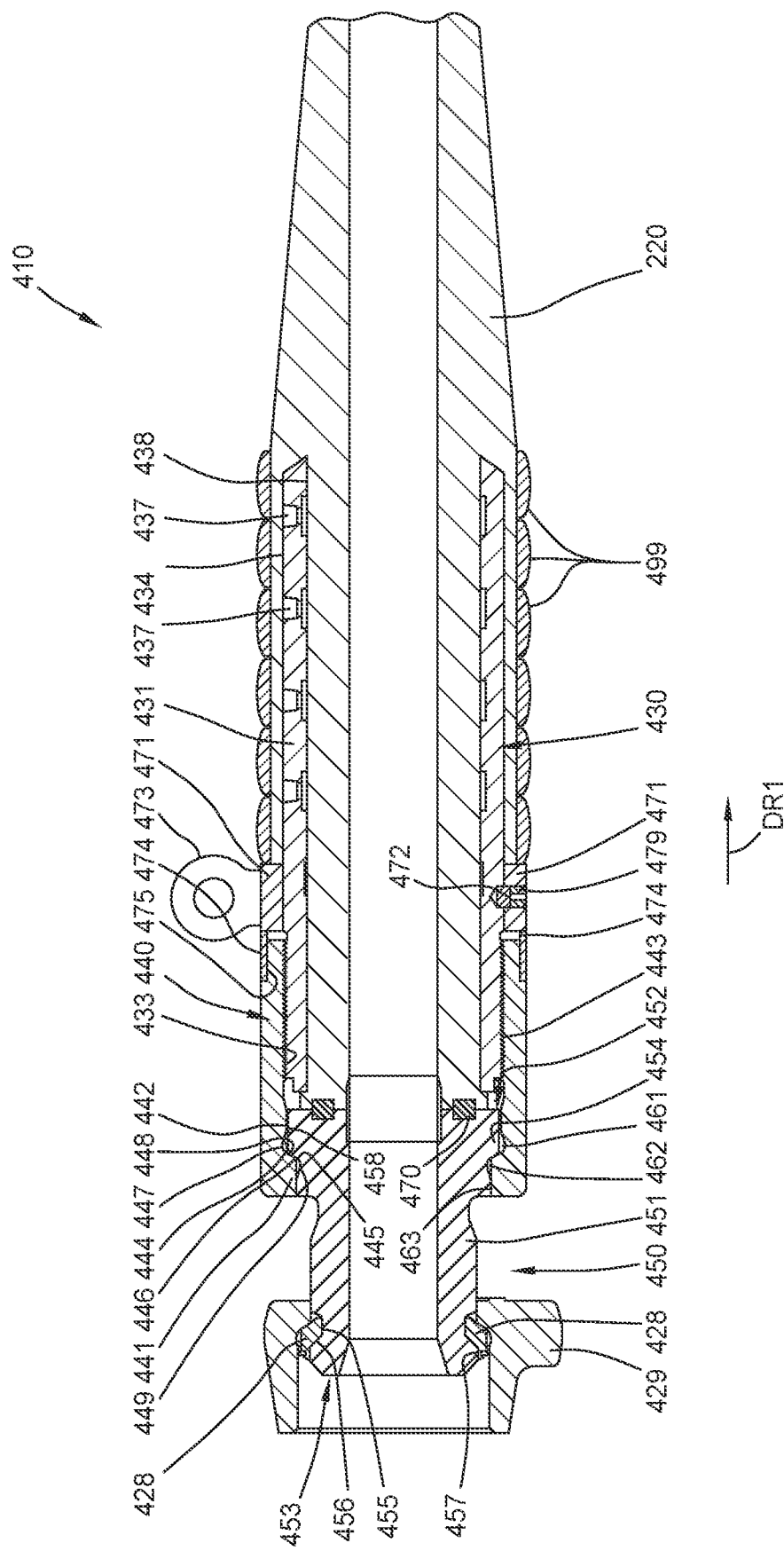
FIG. 4 is a schematic partial illustration of a cross-sectional view of a flexible hose apparatus, according to one implementation.

FIG. 4 is a schematic partial illustration of a cross-sectional view of a flexible hose apparatus 410, according to one implementation. The flexible hose apparatus 410 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 410 is similar to the flexible hose apparatus 210 shown in FIG. 2 and/or the flexible hose apparatus 310 shown in FIG. 3, and may include one or more of the aspects, features, components, and/or properties thereof.

The flexible hose apparatus 410 includes a hose body 430 coupled to the flexible hose 220, a cap 440, and a removable end fitting 450. The hose body 430 is coupled to one of the two ends of the flexible hose 220. Each of the flexible hose 220 and the removable end fitting 450 includes a central opening for flow of fluids, such as production fluids or frac fluids. The hose body 430 includes an elongated ring body 431, and a threaded outer surface 433. The flexible hose 220 is formed within a central opening of the hose body 430 and outside of and along an outer surface 434 of the hose body 430. The elongated ring body 431 of the hose body 430 includes a plurality of injection ports 437 through which the bonding material is injected to facilitate bonding of the hose body 430 and the flexible hose 220. The injection ports 437 extend from the outer surface 434 and to an inner surface 438 of the hose body 430. The flexible hose apparatus 410 includes a plurality of protective wraps 499 disposed about the flexible hose 220. In one embodiment, which can be combined with other embodiments, the flexible hose 220 is bonded to the hose body 430 along an inner surface of the hose body 430, and the flexible hose 220 is rubber wrapped around the outer surface 434 of the hose body 430. The present disclosure contemplates that the inner surface of the hose body 430 may include one or more protrusions and/or one or more recesses formed therein.

The cap 440 includes an inner shoulder 441 that protrudes inwardly relative to a first inner surface 442. The cap 440 also includes a threaded inner surface 443. The first inner surface 442 is disposed between the inner shoulder 441 and the threaded inner surface 443. The threaded inner surface 443 is disposed in threaded engagement with the threaded outer surface 433 of the hose body 430.

The removable end fitting 450 includes a single end body 451. The end body 451 includes a first end 452, a second end 453 opposite of the first end 252, and a first outer shoulder 454 that is adjacent the first end 452. The first outer shoulder 454 is disposed and retained between the inner shoulder 441 of the cap 440 and an end of the flexible hose 220 and/or the hose body 430. The end body 451 also includes an outer groove 455 formed in an outer circumferential surface of the end body 451. The outer groove 455 is formed between the first outer shoulder 454 and the second end 453. The end body 451 also includes a second outer shoulder 456 formed adjacent the second end 453. The second outer shoulder 456 is formed between the outer groove 455 and a second outer surface 457 that is adjacent the second end 453. The outer groove 455 is formed between the second outer shoulder 456 and the first outer shoulder 454. The present disclosure contemplates that the outer groove 455 may be part of another form of connection. As an example, the outer groove 455 may include a threaded outer surface having external threads on a female end of the end body 451 (to engage a male end of a connection device) or a hub of a Grayloc® connection. A threaded outer surface of the end body 451 (that is adjacent the outer groove 455) includes external threads on a female end of the end body 451 that engages a male end of a hammer union 429. In one embodiment, which can be combined with other embodiments, the end body 451 includes an inner surface having internal threads on a male end of the end body 451 to engage a female end of the hammer union 429.

A first outer surface 458 of the first outer shoulder 454 of the end body 451 interfaces with and is disposed within the first inner surface 442 of the cap 440. The flexible hose apparatus 410 includes a primary seal 470 disposed between the end body 451 of the removable end fitting 450 and the flexible hose 220. In one example, the primary seal 470 is disposed in a recess of the end body 451. The removable end fitting 450 includes a single end body 451 that can couple to the flexible hose 220 and/or the hose body 430 using the cap 440 without the use of an insert that is a separate body from the end body 451.

The flexible hose apparatus 410 includes the hammer union 429 coupled to the second outer shoulder 456 of the end body 451 using one or more ring segments 428 (two ring segments 428 are used in the implementation shown in FIG. 4) between the hammer union 429 and the end body 451. The inner shoulder 441 of the cap 440 includes a tapered inner surface 444, and the first outer shoulder 454 of the end body 451 includes a tapered outer surface 445 that interfaces with and abuts against the tapered inner surface 444 of the inner shoulder 441. The tapered inner surface 444 and the tapered outer surface 445 taper outward in the direction DR1 from the end body 451 and toward the flexible hose 220 and the hose body 430. The tapered surfaces 444, 445 facilitate reductions in stresses and reduced likelihoods of failures, and facilitate increased product lifespans. Surfaces of the flexible hose apparatus 410 may be flat or curved, such as rounded. As an example, the tapered inner surface 444 and the tapered outer surface 445 may be flat or curved, such as rounded.

The cap 440 includes one or more rounded inner surfaces 446, 447 that face the end body 451. The tapered inner surface 444 transitions between the rounded inner surfaces 446, 447. The end body 451 includes one or more rounded outer surfaces 448, 449 that face the cap 440. The tapered outer surface 445 transitions between the rounded outer surfaces 448, 449. The rounded inner surface 446 is formed at a corner of the inner shoulder 441 of the cap 440, and the rounded outer surface 448 is formed at a corner of the first outer shoulder 454 of the end body 451.

The present disclosure contemplates that the tapered inner surface 444 may be omitted from the inner shoulder 441, and the tapered outer surface 445 may be omitted from the first outer shoulder 454. The present disclosure contemplates that the inner shoulder 441 may be rectangular in shape, such as square in shape, as is shown for the inner shoulder 241 in FIG. 2. The present disclosure contemplates that the first outer shoulder 454 may be rectangular in shape, such as square in shape, as is shown for the first outer shoulder 254 in FIG. 2.

The cap 440 includes a relieved inner portion 461 formed between the first inner surface 442 and the inner shoulder 441. The relieved inner portion 461 extends into the cap 440 and outwardly of the first inner surface 442. The end body 451 includes a relieved outer portion 462 formed between a third outer surface 463 of the end body 451 and the first outer shoulder 454. The relieved portions 461, 462 facilitate stress reductions and increased product lifespans.

The present disclosure contemplates that rounding, such as a small root radius of a rounded inner surface that transitions between the inner shoulder 441 and the first inner surface 442 (such as between the tapered inner surface 444 and the first inner surface 442), may form a relieved inner portion between the first inner surface 442 and the inner shoulder 441. A radius of the rounding of the rounded inner surface ends (in a direction outwardly) on the inner diameter of the first inner surface 442. In such an embodiment, the rounded inner surface does not extend outwardly of the inner diameter of the first inner surface 442.

The present disclosure contemplates that rounding, such as a small root radius of a rounded outer surface that transitions between the first outer shoulder 454 and the third outer surface 463 (such as between the tapered outer surface 445 and the third outer surface 463), may form a relieved outer portion between the third outer surface 463 and the first outer shoulder 454. A radius of the rounding of the rounded outer surface ends (in a direction inwardly) on the outer diameter of the third outer surface 463. In such an embodiment, the rounded outer surface does not extend inwardly of the outer diameter of the third outer surface 463.

The flexible hose apparatus 410 also includes a knurl ring 471 disposed about the hose body 430, and one or more shear pins 472. The shear pins 472 are disposed through the knurl ring 471 and at least partially into the hose body 430. The shear pins 472 are disposed through an interfaces between the knurl ring 471 and the hose body 430. The flexible hose apparatus 410 also includes a lift eye 473 coupled to the knurl ring 471. The flexible hose apparatus 410 includes one or more set screws 479. Each of the set screws 479 corresponds to one of the shear pins 472 to set the respective shear pin 472 in place. The set screws 479 are disposed in and threaded into the knurl ring 471. In one embodiment, which can be combined with other embodiments, the flexible hose apparatus 410 includes one or more tabs 474 (two are shown) coupled to the cap 440 and the knurl ring 471. In one example, the cap 440 includes one or more recesses 475 formed in an outer surface of the cap 440 that receive the tabs 474. The present disclosure contemplates that the tabs 474 may be omitted. The shear pins 472, the knurl ring 471, the set screws 479, and/or the tabs 474 facilitate preventing rotation of the hose body 430 relative to the cap 440 to facilitate performance of the flexible hose apparatus 410 and reduced likelihood of failure. The knurl ring 471 may be welded to the hose body 430, such as an outer shoulder of the hose body 430 that is similar to the outer shoulder 232 shown in FIG. 2. In one embodiment, which can be combined with other embodiments, the tabs 474 are welded to the cap 440 and welded to the knurl ring 471.

FIG. 5 is a schematic partial illustration of a cross-sectional view of a flexible hose apparatus 510, according to one implementation. The flexible hose apparatus 510 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 510 is similar to the flexible hose apparatus 210 shown in FIG. 2, and may include one or more of the aspects, features, components, and/or properties thereof.

The flexible hose apparatus 510 includes a removable end fitting 550. The removable end fitting 550 includes an end body 551 that is similar to the end body 251 shown in FIG. 2. The end body 551 includes a first end 552 and a second end 553 that is opposite of the first end 552. The end body 551 includes a first outer shoulder 554 adjacent the first end 552. The first outer shoulder 554 is abutting against the hose body 530. The first outer shoulder 554 is a flange. The flexible hose apparatus 510 also includes a plurality of fasteners 576 that couple the end body 551 to the hose body 530. The fasteners 576 include one or more of screws (such as cap screws, for example socket head cap screws), threaded studs, nuts (such as hex nuts), and/or bolts. The plurality of fasteners 576 extend through the first outer shoulder 554, past the first end 552 of the end body 551, and at least partially into an end of the hose body 530. The plurality of fasteners 576 are disposed in holes formed in the first outer shoulder 554 and into recesses formed in the end of the hose body 530. The flexible hose 220 is formed within the hose body 530 and about a recessed portion 577 of the hose body 530. The fasteners 576 are disposed at least partially into an outer portion 578 that protrudes outwardly relative to the recessed portion 577. The present disclosure contemplates that the outer portion 578 may be a tapered portion, or the outer portion 578 may be omitted. The removable end fitting 550 includes a male arrangement and the hose body 530 includes a female arrangement in the implementation shown in FIG. 5. Heads of the fasteners 576 are disposed within the first outer shoulder 554 of the end body 551. The present disclosures contemplates that the first outer shoulder 554 may be omitted with the heads of fasteners 576 disposed in the end body 551. The present disclosure contemplates that the heads of the fasteners 576 may be exposed and disposed outside of the first outer shoulder 554.

FIG. 6 is a schematic partial illustration of a cross-sectional view of a flexible hose apparatus 610, according to one implementation. The flexible hose apparatus 610 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 610 is similar to the flexible hose apparatus 510 shown in FIG. 5, and may include one or more of the aspects, features, components, and/or properties thereof.

The flexible hose apparatus 610 includes a removable end fitting 650. The removable end fitting 650 includes an end body 651 that is similar to the end body 251 shown in FIG. 2. The end body 651 includes a first end 652 and a second end 653 that is opposite of the first end 652. The end body 651 includes a first outer shoulder 654 adjacent the first end 652. The first outer shoulder 654 is abutting against the hose body 630. The first outer shoulder 654 is a flange. The flexible hose apparatus 610 also includes a plurality of fasteners 676 that couple the end body 651 to the hose body 630. The plurality of fasteners 676 extend through an outer portion 678 of the hose body 630, past an end of the hose body 630, and at least partially into the first outer shoulder 654 of the end body 651. The plurality of fasteners 676 are disposed in holes formed in the outer portion 678 and recessed formed in the first outer shoulder 654.

The flexible hose apparatus 610 includes a flexible hose 620 that is similar to the flexible hose 220 shown in FIG. 2. The flexible hose 620 is formed within the hose body 630 and is not formed about the recessed portion 577 of the hose body 630. The present disclosure contemplates that the flexible hose 620 may be formed, such as rubber wrapped, about the recessed portion 577. The removable end fitting 650 includes a female arrangement and the hose body 630 includes a male arrangement in the implementation shown in FIG. 6. Heads of the fasteners 676 are disposed within the outer portion 678 of the hose body 630. The present disclosure contemplates that the heads of the fasteners 676 may be exposed and disposed outside of the outer portion 678.

Figure 7A:
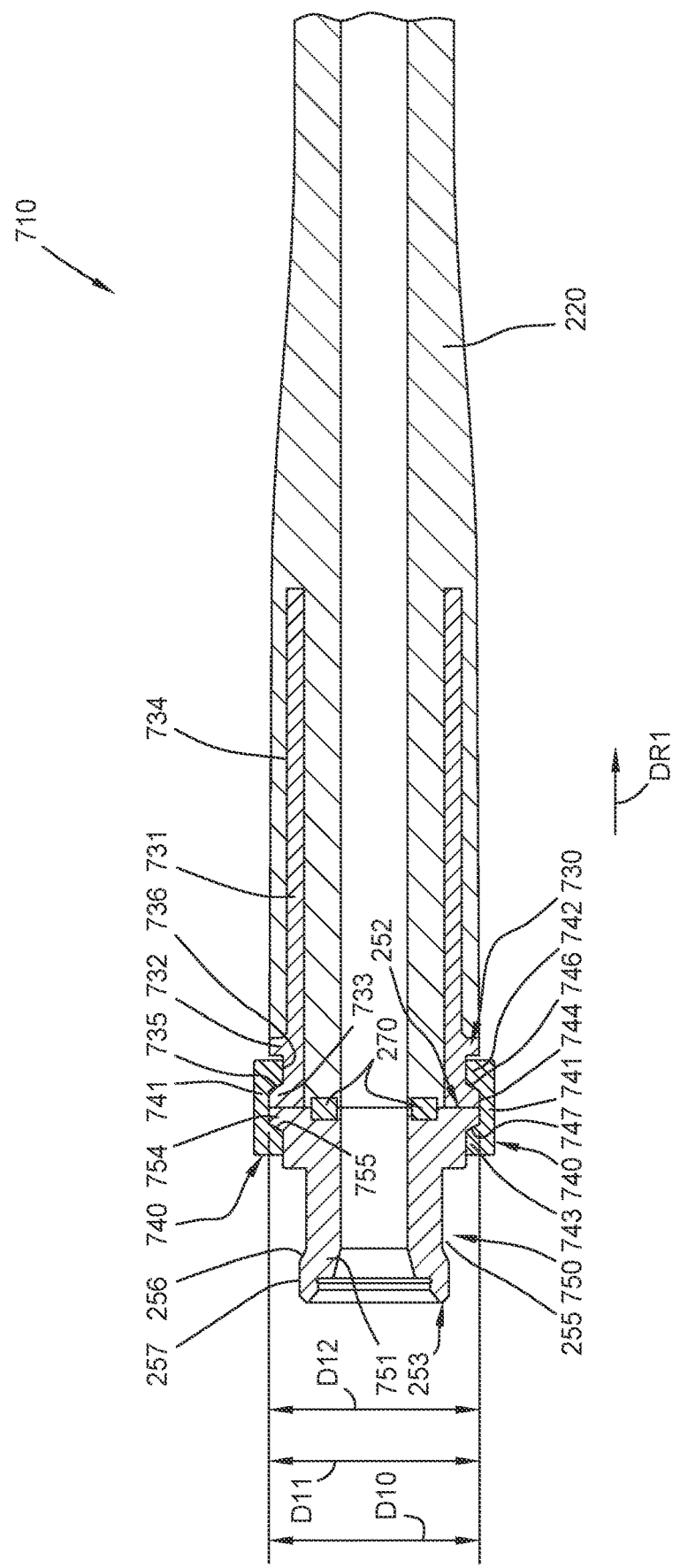
FIG. 7A is a schematic partial illustration of a cross-sectional view of a flexible hose apparatus, according to one implementation.

FIG. 7A is a schematic partial illustration of a cross-sectional view of a flexible hose apparatus 710, according to one implementation. The flexible hose apparatus 710 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof.

The flexible hose apparatus 710 is similar to the flexible hose apparatus 210 shown in FIG. 2, and may include one or more of the aspects, features, components, and/or properties thereof.

The flexible hose apparatus 710 includes a hose body 730 that is similar to the hose body 230 shown in FIG. 2. The hose body 730 includes an elongated ring body 731 similar to the elongated ring body 231 shown in FIG. 2, and an outer surface 734 similar to the outer surface 234 shown in FIG. 2. The hose body 730 includes a first outer shoulder 732, a second outer shoulder 733, and an outer groove 736 formed between the first outer shoulder 732 and the second outer shoulder 733. The present disclosure contemplates that the first outer shoulder 732 may be omitted. The flexible hose apparatus 710 includes a removable end fitting 750 that includes an end body 751 similar to the end body 251 shown in FIG. 2. The end body 751 of the removable end fitting 750 is coupled to the hose body 730 using hub clamping. The end body 751 includes a first outer shoulder 754 adjacent the first end 252 and abutting against the hose body 730.

The flexible hose apparatus 710 also includes a plurality of clamps 740 (two are shown) that coupled the end body 751 to the hose body 730. In one embodiment, which can be combined with other embodiments, the clamps 740 form a pin clamshell clamp arrangement. In one example, pins are disposed through the clamps 740 on a first outer side of the end body 751 and fasteners are used to fasten the clamps together on a second outer side of the end body 751. Each of the clamps 740 includes a clamp body 741. The clamp body 741 of each clamp 740 includes a first inner shoulder 742 that protrudes inwardly past the first outer shoulder 732 and past the second outer shoulder 733. The first inner shoulder 742 protrudes inwardly into the outer groove 736 of the hose body 730. The clamp body 741 also includes a second inner shoulder 743 protruding inwardly past the first outer shoulder 754 of the end body 751. Using the clamps 740, the first outer shoulder 754 of the end body 751 and the second outer shoulder 733 of the hose body 730 are clamped and retained between the first inner shoulder 742 and the second inner shoulder 743 of each clamp 740 of the plurality of clamps 740.

Each clamp body 741 also includes a recessed surface 744 between and outwardly of the first inner shoulder 742 and the second inner shoulder 743. The first outer shoulder 754 includes a first outer diameter D10, the second outer shoulder 733 includes a second outer diameter D11, and the recessed surface 744 includes a first inner diameter D12. The first outer diameter D10 and the second outer diameter D11 are equal to or lesser than the first inner diameter D12. The second outer shoulder 733 of the hose body 730 includes a tapered outer surface 735 that interfaces with and engages a first tapered inner surface 746 of each clamp 740 of the clamps 740. The first outer shoulder 754 of the end body 751 includes a tapered outer surface 755 that interfaces with and engages a second tapered inner surface 747 of each clamp 740 of the clamps 740. The tapered outer surface 755 and the second tapered inner surface 747 taper outwardly in the direction DR1. The tapered outer surface 735 and the first tapered inner surface 746 taper inwardly in the direction DR1.

Figure 7B:
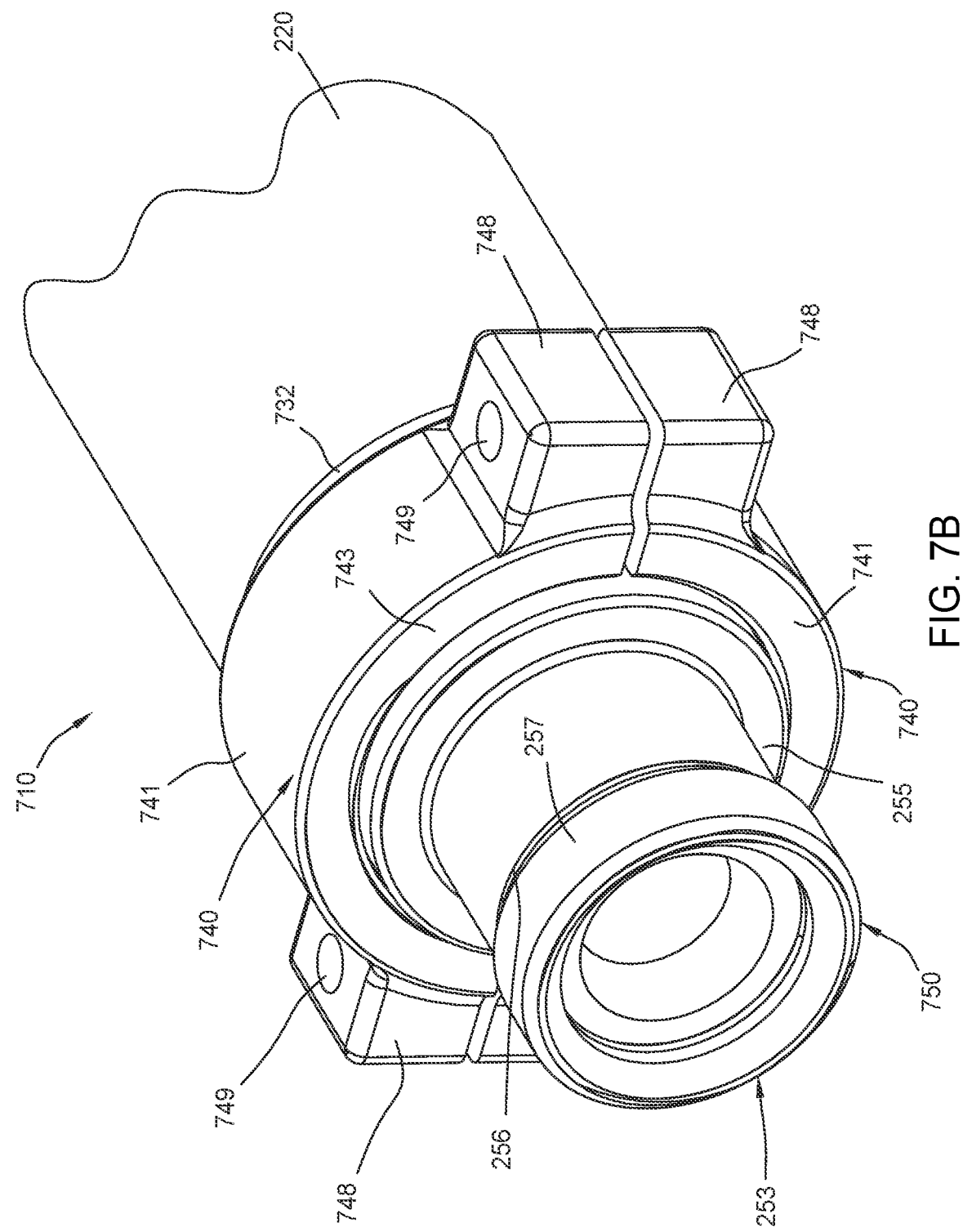
FIG. 7B is a schematic partial illustration of a perspective view of the flexible hose apparatus shown in FIG. 7A, according to one implementation.

FIG. 7B is a schematic partial illustration of a perspective view of the flexible hose apparatus 710 shown in FIG. 7A, according to one implementation. The clamp body 741 of each clamp 740 of the clamps 740 includes a plurality of flanges 748. Each flange 748 includes a fastener opening 749 formed therein to receive a fastener to facilitate clamping the clamps 740.

Figure 7C:
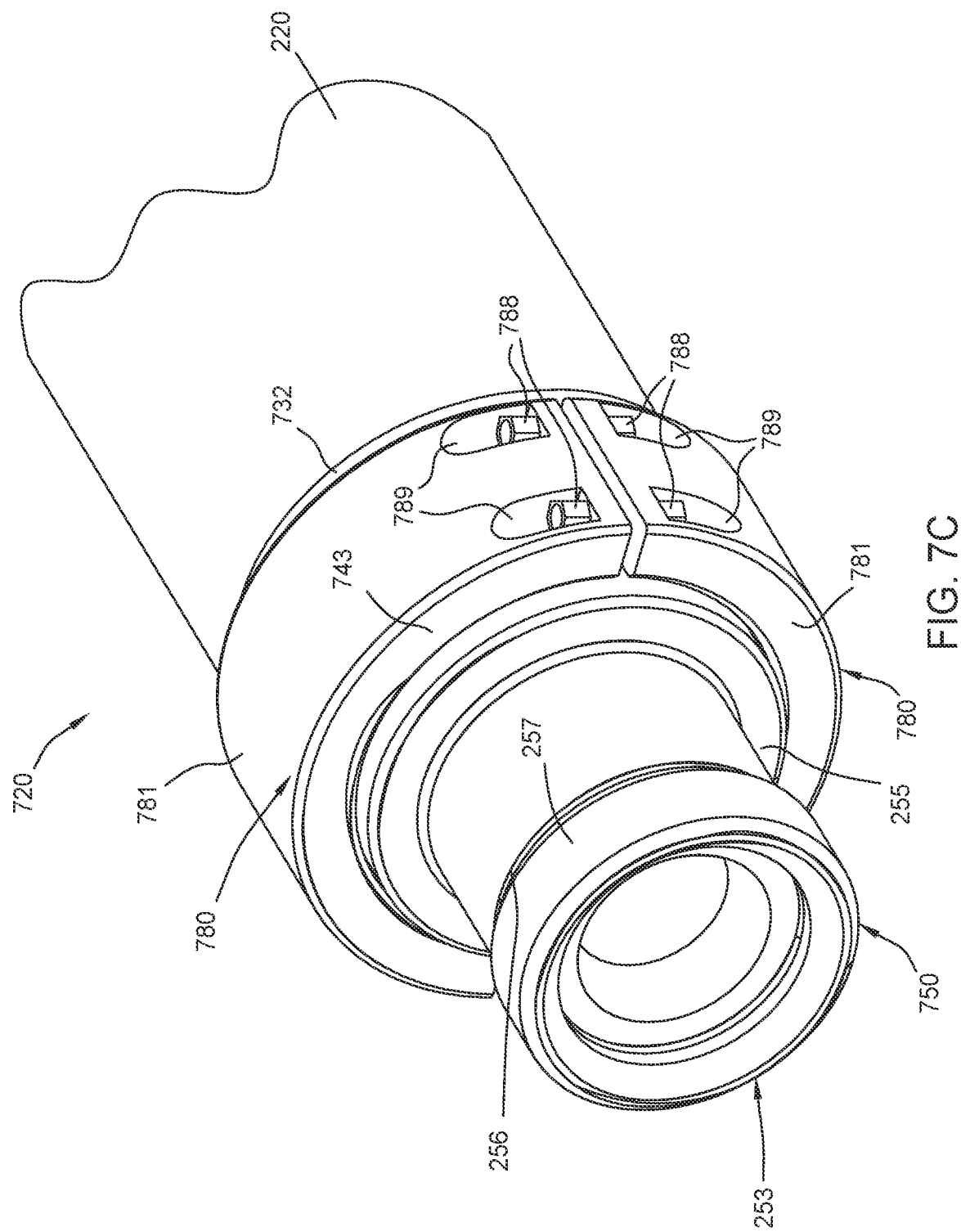
FIG. 7C is a schematic partial illustration of a perspective view of a flexible hose apparatus, according to one implementation.

FIG. 7C is a schematic partial illustration of a perspective view of a flexible hose apparatus 720, according to one implementation. The flexible hose apparatus 720 is similar to the flexible hose apparatus 710 shown in FIGS. 7A and 7B. The flexible hose apparatus 720 includes a plurality of clamps 780 used in place of the clamps 740 shown in FIGS. 7A and 7B. The clamps 780 are similar to the clamps 740 shown in FIGS. 7A and 7B, and includes one or more of the features, components, aspects, and/or properties thereof. The clamps 780 includes low profile aspects. Each clamp 780 includes a clamp body 781. Each clamp body 781 includes one or more fastener openings 789 (four fastener openings 789 are included for each clamp body 781, with two fastener openings 789 on each side of the end body 751 for each clamp body 781) formed tangentially to a geometric center of the arcuate profile of the respective clamp body 781. The fastener openings 789 are counter bored holes formed in the clamp bodies 781. One or more fasteners 788 (four fasteners 788 are included, with two fasteners 788 on each side of the end body 751) are disposed through the fastener openings 789 to clamp the clamps 780 together. The clamps 780 are disposed about the end body 751 and the hose body 730 to clamp the end body 751 and the hose body 730 together.

Figure 8A:
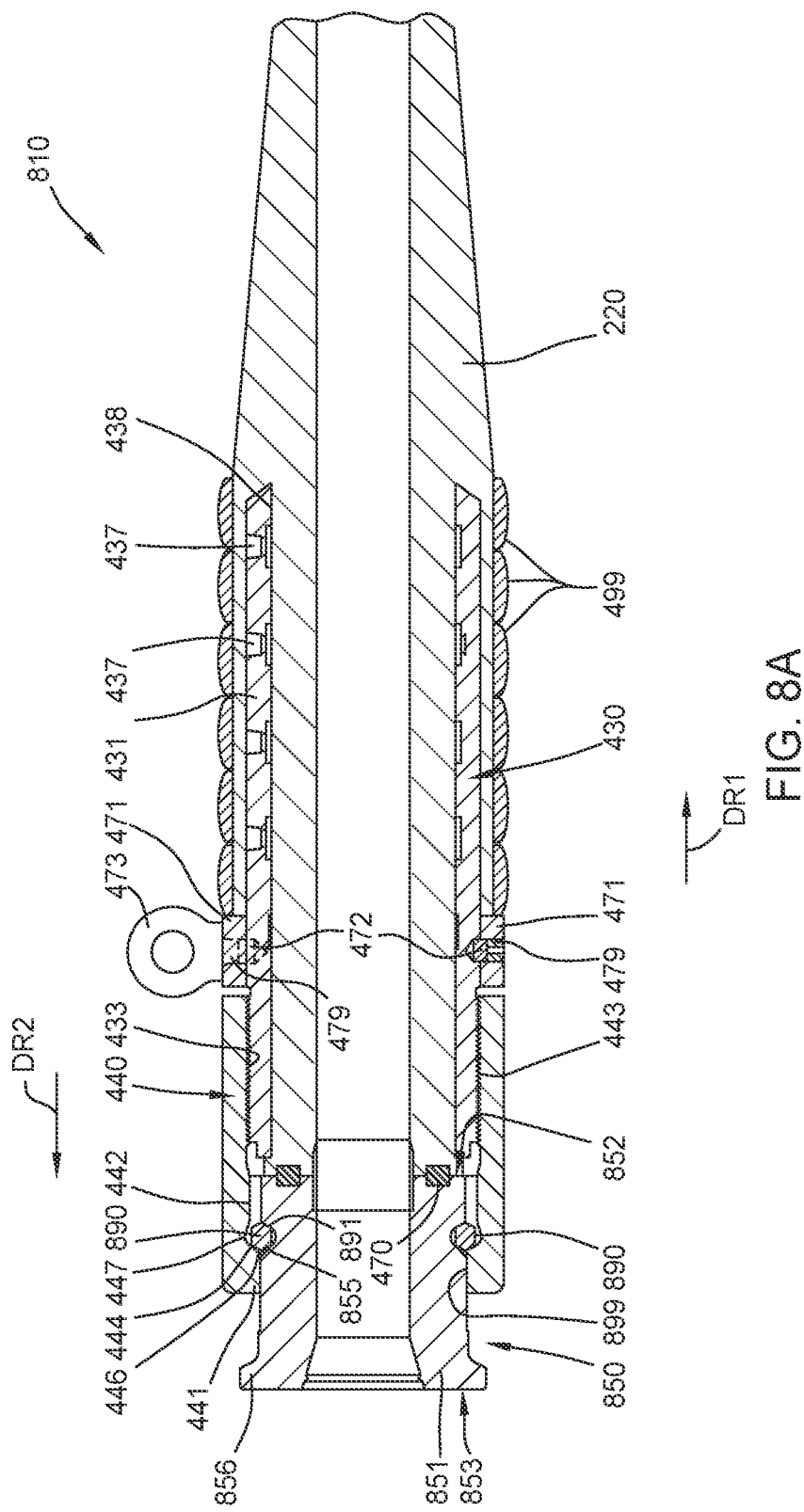
FIG. 8A is a schematic partial illustration of a cross-sectional view of a flexible hose apparatus, according to one implementation.

FIG. 8A is a schematic partial illustration of a cross-sectional view of a flexible hose apparatus 810, according to one implementation. The flexible hose apparatus 810 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 810 is similar to the flexible hose apparatus 410 shown in FIG. 4, and may include one or more of the aspects, features, components, and/or properties thereof.

The removable end fitting 850 includes a single end body 851. The end body 851 includes a first end 852, a second end 853 opposite of the first end 852, and an outer shoulder 856 adjacent the second end 853. The end body 851 includes an outer groove 855 formed in an outer circumferential surface 899. The outer groove 855 is formed between the first end 852 and the second end 853 of the end body 851. The flexible hose apparatus 810 also includes a plurality of ring segments 890 (two are shown in FIG. 8A) disposed between the end body 851 and the cap 440. The ring segments 890 include two or more ring segments, such as twelve ring segments. The ring segments 890 are disposed at least partially in the outer groove 855 of the end body 851. The ring segments 890 abut against the inner shoulder 441 of the cap 440. The ring segments 890 abut against and are retained between the tapered inner surface 444 of the cap 440 and a tapered or rounded outer surface 891 of the end body 851. The present disclosure contemplates that surfaces (such as contact surfaces) of the cap 440, the end body 851, and/or the ring segments 890 can be tapered or curved, such as rounded. As an example, the inner surface 444 may be tapered or curved, such as rounded.

Each of the ring segments 890 includes a cross-sectional shape that is hexagonal. The cross-sectional shape of the ring segments 890 includes sides and corners that are tapered or rounded. The cross-sectional shape of the ring segments 890 may be a shape other than hexagonal. In one example, the cross-sectional shape of the ring segments 890 may be the same as the cross-sectional shape of the ring segments 428 shown in FIG. 4. In one embodiment, which can be combined with other embodiments, the ring segments 890 are installed by positioning the ring segments 890 between the end body 851 and the cap 440 prior to installing the cap 440 onto the hose body 430. In one example, the cap 440 is moved (such as by using a hammer union) in the direction DR2 relative to the end body 851 and past the outer groove 855, and the ring segments 890 are then placed in the outer groove 855. The cap 440 is then moved (such as by using a hammer union) in the direction DR1 until the inner surface 444 engages the ring segments 890. In one embodiment, which can be combined with other embodiments, the ring segments 890 are installed by disposing the ring segments 890 through one or more openings (such as machined holes) formed in a wall of the cap 440 and positioning the ring segments 890 between the end body 851 and the cap 440.

FIG. 8B is a schematic partial illustration of a perspective view of the plurality of ring segments 890 shown in FIG. 8A, according to one implementation. The plurality of ring segments 890 includes twelve ring segments 890.

Figure 9:
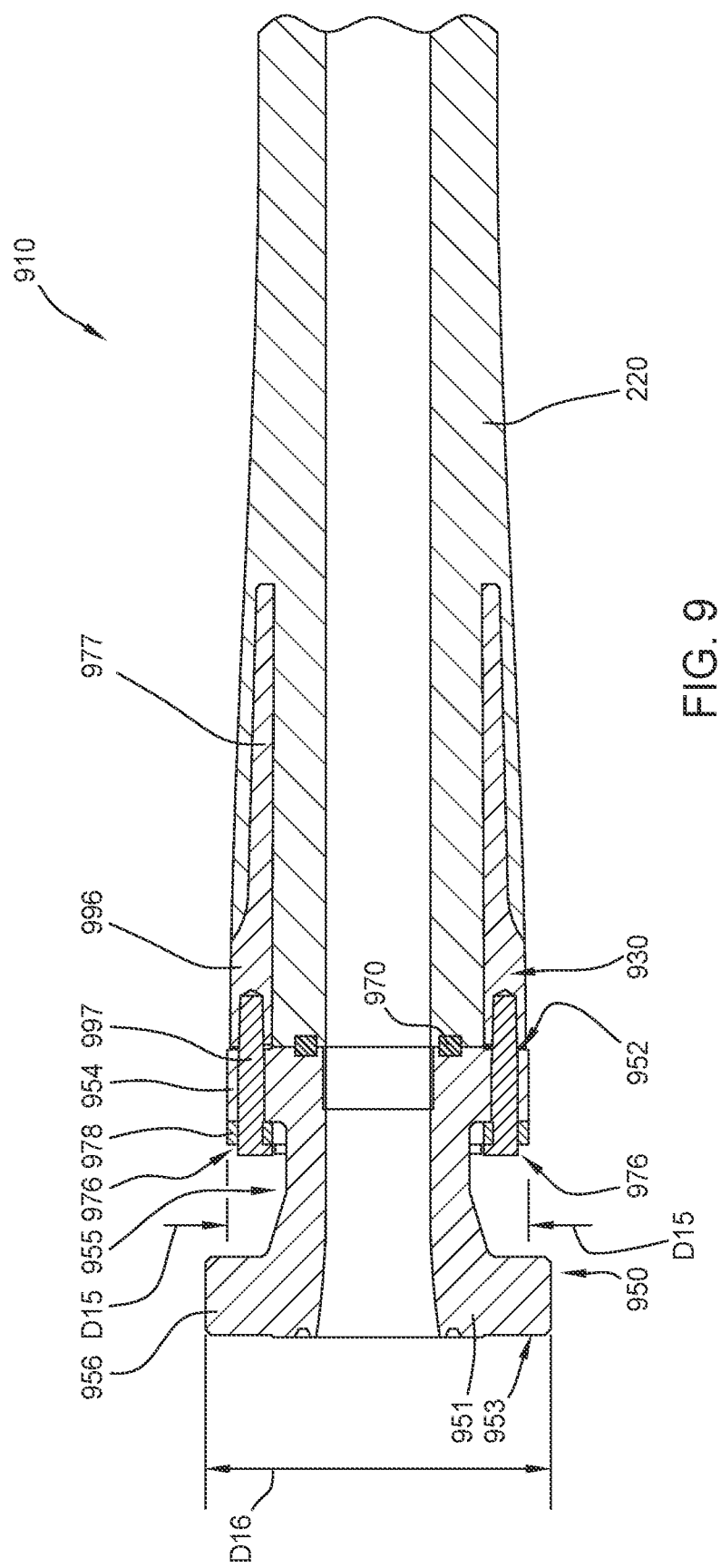
FIG. 9 is a schematic partial illustration of a cross-sectional view of a flexible hose apparatus, according to one implementation.

FIG. 9 is a schematic partial illustration of a cross-sectional view of a flexible hose apparatus 910, according to one implementation. The flexible hose apparatus 910 may be deployed as one or more of the flexible hose apparatus 190, the flexible hose apparatus 195, the flexible hose apparatus 203, the flexible hose apparatus 206, and/or the flexible hose apparatus 207 shown in FIG. 1, and may include one or more of the aspects, features, components, and/or properties thereof. The flexible hose apparatus 910 is similar to the flexible hose apparatus 510 shown in FIG. 5, and may include one or more of the aspects, features, components, and/or properties thereof.

The flexible hose apparatus 910 includes a removable end fitting 950. The removable end fitting 950 includes an end body 951. The end body 951 may include aspects, features, components, and/or properties that are similar to the aspects, features, components, and/or properties of the end body 251 shown in FIG. 2. The end body 951 includes a first end 952 and a second end 953 that is opposite of the first end 952. The end body 951 includes a first outer shoulder 954 adjacent the first end 952. The first outer shoulder 954 is a flange. The end body 951 also includes a second outer shoulder 956 adjacent the second end 953, and an outer groove 955 formed between the first outer shoulder 954 and the second outer shoulder 956. The flexible hose apparatus 910 includes a primary seal 970 disposed between the end body 951 of the removable end fitting 950 and the flexible hose 220.

The flexible hose apparatus 910 also includes a plurality of fasteners 976 that couple the end body 951 to a hose body 930. In the implementation shown, each fastener 976 includes a threaded stud 997 and a nut 978. The plurality of fasteners 976 extend through the first outer shoulder 954 of the end body 951 and at least partially into the hose body 930 through an end of the hose body 930. The plurality of fasteners 576 are disposed in holes formed in the first outer shoulder 954 and into recesses formed in the end of the hose body 930.

The flexible hose 220 is formed within the hose body 930 and about a recessed portion 977 of the hose body 930. In one embodiment, which can be combined with other embodiments, the flexible hose 220 is not formed about the hose body 930. The present disclosure contemplates that the recessed portion 977 may be omitted. The fasteners 976 are disposed at least partially into an outer portion 996 that protrudes outwardly relative to the recessed portion 977. The removable end fitting 950 includes a male arrangement and the hose body 930 includes a female arrangement in the implementation shown in FIG. 9. Heads of the fasteners 976, in the form of nuts 978, are disposed outwardly of the first outer shoulder 954 of the end body 951. The first outer shoulder 954 of the end body 951 includes a first outer diameter D15, and the second outer shoulder 956 of the end body 951 includes a second outer diameter D16 that is larger than the first outer diameter D15. The present disclosure contemplates that the second outer diameter D16 can be smaller than the first outer diameter D15.

The present disclosure contemplates that each of the removable end fittings 250, 350, 450, 550, 650, 750, 850, 950 described herein may be used with a flexible hose (such as the flexible hose 220) having a flow bore with a diameter of lesser than 5.0 inches, such as 3.5 inches or less.

The present disclosure also contemplates that each of the removable end fittings 250, 350, 450, 550, 650, 750, 850, 950 described herein may be used on both (two) ends of a flexible hose (such as the flexible hose 220).

The present disclosure contemplates that the flexible hose apparatus disclosed herein may include swivel connections, such as swivel flange connections, that facilitate swivel movement between components, such as swivel movement between a flange and a hose body. The swivel connections may include bearings to facilitate swivel movement. The present disclosure contemplates that a swivel connection may be coupled to the removable end fitting. The present disclosure also contemplates that a swivel connection may be coupled to both ends of the flexible hose of the various flexible hose apparatus described herein. The present disclosure also contemplates that the swivel connection may be used on flexible hoses having flow bores with any diameter, such as a diameter of less than 5.0 inches, or a diameter of 5.0 inches or greater.

Benefits of the present disclosure includes ease of removal and replacement of end fittings on flexible hoses; ease of installation of end fittings on flexible hoses; increased operational lifespans of flexible hose apparatus; withstanding of operational conditions such as high operating pressures and vibrations in land-based applications (for example land-based stimulation operations); reduced likelihoods of failures of flexible hose apparatus; increased operational efficiencies, and reduced operational costs; and modularity in application of end fittings.

It is contemplated that one or more of the aspects disclosed herein may be combined. Moreover, it is contemplated that one or more of these aspects may include some or all of the aforementioned benefits. As an example, the present disclosure contemplates that one or more of the aspects, features, components, and/or properties of the flexible hose apparatus 210, the flexible hose apparatus 310, the flexible hose apparatus 410, the flexible hose apparatus 510, the flexible hose apparatus 610, the flexible hose apparatus 710, the flexible hose apparatus 810, and/or the flexible hose apparatus 910 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A flexible hose apparatus, comprising:
a flexible hose;
a hose body coupled to the flexible hose, wherein the flexible hose is monolithic and formed out of the same material, at least partially disposed in a central opening of the hose body, and at least partially disposed along an outer surface of the hose body;
a removable end fitting comprising an end body that is monolithic, the end body comprising an outer shoulder abutting against an outer shoulder of the hose body, wherein the outer shoulder of the end body is located at one end of the end body and includes a first outer diameter, and wherein the end body further comprises a second outer shoulder located at an opposite end of the end body and includes a second outer diameter that is less than the first outer diameter; and
a plurality of connection members that couple the outer shoulder of the end body and the outer shoulder of the hose body together to couple the removable end fitting to the hose body.

2. The flexible hose apparatus of claim 1, wherein the plurality of connection members comprise a plurality of fasteners that extend at least partially through the outer shoulder of the end body and at least partially into the outer shoulder of the hose body.

3. The flexible hose apparatus of claim 1, wherein the plurality of connection members comprise a plurality of fasteners that extend at least partially through the outer shoulder of the hose body and at least partially into the outer shoulder of the end body.

4. The flexible hose apparatus of claim 1, wherein the plurality of connection members comprise a pair of clamp members coupling the outer shoulder of the end body and the outer shoulder of the hose body together.

5. The flexible hose apparatus of claim 4, wherein each clamp member comprises a first inner shoulder protruding inwardly past the outer shoulder of the end body; and a second inner shoulder protruding inwardly past the outer shoulder of the hose body, wherein the outer shoulder of the end body and the outer shoulder of the hose body are coupled together between the first inner shoulder and the second inner shoulder of each clamp member.

6. The flexible hose apparatus of claim 4, wherein each clamp member comprises a pair of flanges located at opposite ends of the clamp member, and wherein each flange comprises a fastener opening formed therein to receive a fastener to couple the clamp members together about the outer shoulder of the end body and the outer shoulder of the hose body.

7. The flexible hose apparatus of claim 4, wherein each clamp member comprises a fastener opening in the form of a counter bored hole located at opposite ends of the clamp member to receive a fastener to couple the clamp members together about the outer shoulder of the end body and the outer shoulder of the hose body.

8. A fluid injection system comprising the flexible hose apparatus of claim 1, wherein the end body of the removable end fitting is coupled to a piece of equipment, and the piece of equipment includes one or more of a wellhead connection jumper system, a pod system, an iron string, a zipper frac device, a pump manifold, a fluid end of a pump, an instrumentation skid, or a wellhead.

9. A flexible hose apparatus, comprising:
a flexible hose;
a hose body coupled to the flexible hose, wherein the flexible hose is monolithic and formed out of the same material, at least partially disposed within a central opening of the hose body, and at least partially disposed along an outer surface of the hose body;
a removable end fitting coupled to the hose body, the removable end fitting comprising an end body that is monolithic, the end body comprising:
a first end;
a second end opposite of the first end;
a first outer shoulder adjacent the first end and abutting against the hose body; and a second outer shoulder adjacent the second end, wherein the second outer shoulder has an outer diameter that is less than an outer diameter of the first shoulder; and a plurality of connection members that couple the removable end fitting to the hose body.

10. The flexible hose apparatus of claim 9, wherein the plurality of connection members comprise a plurality of fasteners that extend at least partially through the first outer shoulder of the end body and at least partially into the hose body.

11. The flexible hose apparatus of claim 9, wherein the plurality of connection members comprise a plurality of fasteners that extend at least partially through an outer shoulder of the hose body and at least partially into the first outer shoulder of the end body.

12. The flexible hose apparatus of claim 9, wherein the plurality of connection members comprise a pair of clamp members coupling the first outer shoulder of the end body and an outer shoulder of the hose body together.

13. The flexible hose apparatus of claim 12, wherein each clamp member comprises a first inner shoulder protruding inwardly past the first outer shoulder of the end body; and a second inner shoulder protruding inwardly past the outer shoulder of the hose body, wherein the first outer shoulder of the end body and the outer shoulder of the hose body are coupled together between the first inner shoulder and the second inner shoulder of each clamp member.

14. The flexible hose apparatus of claim 12, wherein each clamp member comprises a pair of flanges located at opposite ends of the clamp member, and wherein each flange comprises a fastener opening formed therein to receive a fastener to couple the clamp members together about the first outer shoulder of the end body and the outer shoulder of the hose body.

15. The flexible hose apparatus of claim 12, wherein each clamp member comprises a fastener opening in the form of a counter bored hole located at opposite ends of the clamp member to receive a fastener to couple the clamp members together about the first outer shoulder of the end body and the outer shoulder of the hose body.

16. A fluid injection system comprising the flexible hose apparatus of claim 9, wherein the end body of the removable end fitting is coupled to a piece of equipment, and the piece of equipment includes one or more of a wellhead connection jumper system, a pod system, an iron string, a zipper frac device, a pump manifold, a fluid end of a pump, an instrumentation skid, or a wellhead.

17. The flexible hose apparatus of claim 9, further comprising a primary seal disposed between and within respective recesses of the end body and the flexible hose, wherein at least a portion of the primary seal and the recess of the flexible hose are disposed within the central opening of the hose body.

18. A flexible hose apparatus, comprising:

a flexible hose;

a hose body coupled to the flexible hose, wherein the flexible hose is monolithic and formed out of the same material, at least partially disposed in a central opening of the hose body, and at least partially disposed along an outer surface of the hose body;

a removable end fitting comprising an end body that is monolithic, the end body comprising an outer shoulder abutting against an outer shoulder of the hose body;

a plurality of connection members that couple the outer shoulder of the end body and the outer shoulder of the hose body together to couple the removable end fitting to the hose body; and a primary seal disposed between and within respective recesses of the end body and the flexible hose, wherein at least a portion of the primary seal and the recess of the flexible hose are disposed within the central opening of the hose body.

\* \* \* \* \*